United States Patent
Chun et al.

(10) Patent No.: US 10,558,604 B2
(45) Date of Patent: Feb. 11, 2020

(54) COMMUNICATION INTERFACE TRANSACTION SECURITY

(71) Applicant: QUALCOMM Incorporated, San Diego, CA (US)

(72) Inventors: Christopher Kong Yee Chun, Austin, TX (US); Chris Rosolowski, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 5 days.

(21) Appl. No.: 15/849,459

(22) Filed: Dec. 20, 2017

(65) Prior Publication Data

US 2019/0188175 A1    Jun. 20, 2019

(51) Int. Cl.

| | |
|---|---|
| *G06F 13/40* | (2006.01) |
| *G06F 13/364* | (2006.01) |
| *G06F 13/38* | (2006.01) |
| *G06F 13/42* | (2006.01) |
| *H04L 12/40* | (2006.01) |
| *G06F 13/362* | (2006.01) |
| *G06F 1/3209* | (2019.01) |
| *G06F 13/16* | (2006.01) |
| *G06F 1/3234* | (2019.01) |
| *H04L 12/403* | (2006.01) |

(52) U.S. Cl.
CPC ........ *G06F 13/4031* (2013.01); *G06F 1/3209* (2013.01); *G06F 1/3278* (2013.01); *G06F 13/1605* (2013.01); *G06F 13/362* (2013.01); *G06F 13/364* (2013.01); *G06F 13/385* (2013.01); *G06F 13/4282* (2013.01); *H04L 12/403* (2013.01); *H04L 12/40013* (2013.01); *G06F 2213/0016* (2013.01); *G06F 2213/0042* (2013.01); *H04L 12/40* (2013.01)

(58) Field of Classification Search
CPC ... G06F 13/364; G06F 13/385; G06F 13/4282
USPC .................................................. 710/240–244
See application file for complete search history.

(56) References Cited

U.S. PATENT DOCUMENTS

| | | | |
|---|---|---|---|
| 4,933,845 A * | 6/1990 | Hayes ..................... | G06F 13/40 710/104 |
| 5,884,051 A * | 3/1999 | Schaffer ................ | G06F 13/364 710/107 |

(Continued)

FOREIGN PATENT DOCUMENTS

| | | |
|---|---|---|
| EP | 0737924 A2 | 10/1996 |
| EP | 1226493 A2 | 7/2002 |

(Continued)

OTHER PUBLICATIONS

Description of SCSI from Wikipedia Nov. 14, 2011 (Year: 2011).*

(Continued)

*Primary Examiner* — Paul R. Myers
(74) *Attorney, Agent, or Firm* — Robert A. Reid

(57) ABSTRACT

An integrated circuit includes a processor to monitor a communication interface arbitration sequence on a system bus, determine, based on the monitored arbitration sequence, a master or slave identifier that is sending a transaction on the system bus, and process the transaction based on the determined master or slave identifier that is sending the transaction.

20 Claims, 6 Drawing Sheets

(56) References Cited

U.S. PATENT DOCUMENTS

| | | | | |
|---|---|---|---|---|
| 6,199,133 | B1* | 3/2001 | Schnell | H04L 41/24 709/208 |
| 7,444,668 | B2* | 10/2008 | Moyer | G06F 21/316 710/110 |
| 8,732,354 | B1* | 5/2014 | Salli | G06F 3/0622 340/5.3 |
| 8,806,654 | B2* | 8/2014 | Thanner | G06F 21/606 709/208 |
| 8,886,899 | B1* | 11/2014 | Bao | G06F 9/5022 711/158 |
| 9,727,267 | B1* | 8/2017 | Sebastian | G06F 3/0625 |
| 2002/0023186 | A1* | 2/2002 | Kim | G06F 13/362 710/244 |
| 2003/0115393 | A1* | 6/2003 | Kim | G06F 13/362 710/240 |
| 2003/0200442 | A1* | 10/2003 | Bhat | H04L 63/102 713/182 |
| 2003/0229742 | A1 | 12/2003 | Moss et al. | |
| 2004/0010646 | A1* | 1/2004 | Kim | G06F 13/364 710/116 |
| 2005/0060581 | A1 | 3/2005 | Chebolu et al. | |
| 2006/0282587 | A1* | 12/2006 | Srinivasan | G06F 13/1626 710/240 |
| 2007/0255873 | A1* | 11/2007 | Chou | G06F 13/364 710/113 |
| 2008/0215722 | A1 | 9/2008 | Hogaboom et al. | |
| 2008/0215782 | A1* | 9/2008 | Mochida | G06F 13/1605 710/117 |
| 2011/0225651 | A1* | 9/2011 | Villasenor | G06F 21/85 726/22 |
| 2013/0205099 | A1* | 8/2013 | Guthrie | G06F 12/0831 711/146 |
| 2014/0032803 | A1* | 1/2014 | Gupta | G06F 13/362 710/113 |
| 2015/0163211 | A1* | 6/2015 | Chellappa | H04L 63/08 713/155 |
| 2015/0378944 | A1* | 12/2015 | Robertson | G06F 13/24 710/241 |
| 2016/0374038 | A1* | 12/2016 | Wang | H04L 5/0014 |

FOREIGN PATENT DOCUMENTS

| | | |
|---|---|---|
| WO | 9635174 A2 | 11/1996 |
| WO | 2007005815 A1 | 1/2007 |
| WO | 2017209966 A1 | 12/2017 |

OTHER PUBLICATIONS

International Search Report and Written Opinion—PCT/US2018/062090—ISA/EPO—dated Feb. 4, 2019.

Lattice et al., "Arbitration and Switching Between Bus Masters", Feb. 28, 2010, XP055545802, Retrieved from the Internet:URL:httpS:// www. latticesemi.com/-/media/latticeSemi/Documents/ReferenceDesigns/1D/ArbitrationandSwitchingBetweenBusMasters-Documentation.ashx?document 1d=36070 [retrieved on Jan. 22, 2019), 6 pages.

\* cited by examiner

| Present BOM MID | Connecting Master | | | |
|---|---|---|---|---|
| | MID = 0 | MID = 1 | MID = 2 | MID = 3 |
| 0 | | MPL = 0 | MPL = 1 | MPL = 2 |
| 1 | MPL = 2 | | MPL = 0 | MPL = 1 |
| 2 | MPL = 1 | MPL = 2 | | MPL = 0 |
| 3 | MPL = 0 | MPL = 1 | MPL = 2 | |

*FIG. 6*

COMMUNICATION INTERFACE TRANSACTION SECURITY

BACKGROUND

Field

An aspect of the present invention relates to providing communication interface transaction security in an apparatus.

Background

In computing devices, such as laptops, tablets, and smartphones, various integrated circuits are interconnected via a system bus to allow for communication between the integrated circuits. Such communications are used, for example, to manage power for one or more integrated circuits. Such power management can include a power management integrated circuit (PMIC) which provides power and clock signals to a chipset among other functions. If a rogue software accesses the PMIC, it could cause the system to crash, or worse, cause a catastrophic failure of the system such as exploding batteries.

There are specific masters and slaves such as system power management interface (SPMI) masters and slaves that can control the PMIC. A rogue software can access the PMIC via one or more of such masters and slaves which could cause the system to crash or worse cause a catastrophic failure of the system such as exploding batteries.

SUMMARY

In one aspect, a method of providing communications in an apparatus includes monitoring a communication interface arbitration sequence on a system bus, determining, based on the monitored arbitration sequence, a master or slave identifier that is sending a transaction on the system bus, and processing the transaction based on the determined master or slave identifier that is sending the transaction.

In another aspect, an integrated circuit includes a processor to monitor a communication interface arbitration sequence on a system bus, determine, based on the monitored arbitration sequence, a master or slave identifier that is sending a transaction on the system bus, and process the transaction based on the determined master or slave identifier that is sending the transaction.

In yet another aspect, a computing device includes means for monitoring a communication interface arbitration sequence on a system bus, means for determining, based on the monitored arbitration sequence, a master or slave identifier that is sending a transaction on the system bus, and means for processing the transaction based on the determined master or slave identifier that is sending the transaction.

In yet another aspect, a non-transitory, computer-readable medium, having stored thereon computer-readable instructions for providing communications, comprising instructions configured to cause an apparatus to monitor a communication interface arbitration sequence on a system bus, determine, based on the monitored arbitration sequence, a master or slave identifier that is sending a transaction on the system bus, and process the transaction based on the determined master or slave identifier that is sending the transaction.

BRIEF DESCRIPTION OF THE DRAWINGS

FIG. 6 is an example of a table having master identifiers of a present bus owner master and a connecting master according to an aspect of the present invention.

DETAILED DESCRIPTION

Figure 1:
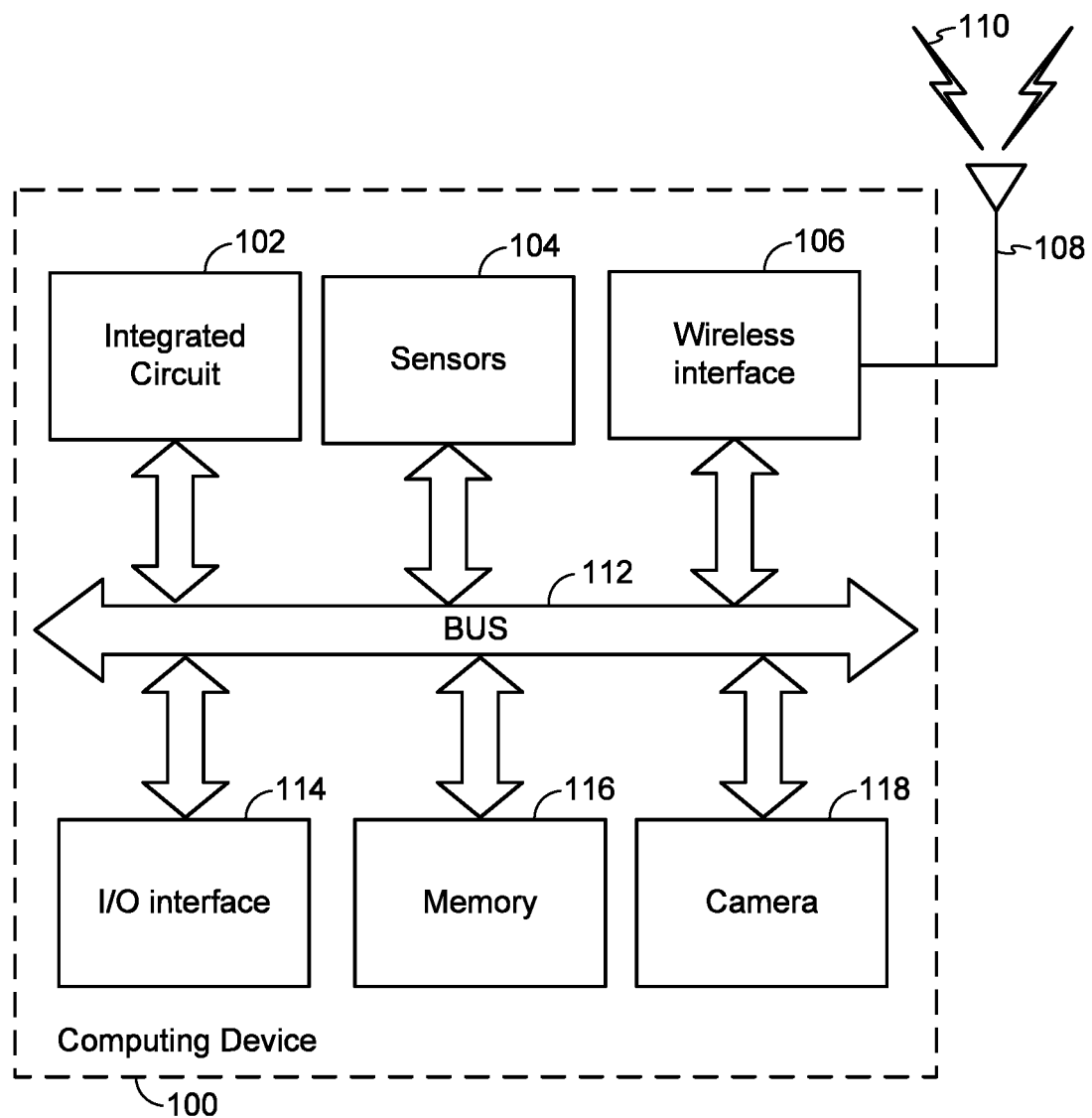
FIG. 1 is a block diagram of a computing device according to an aspect of the present invention.
Figure 2:
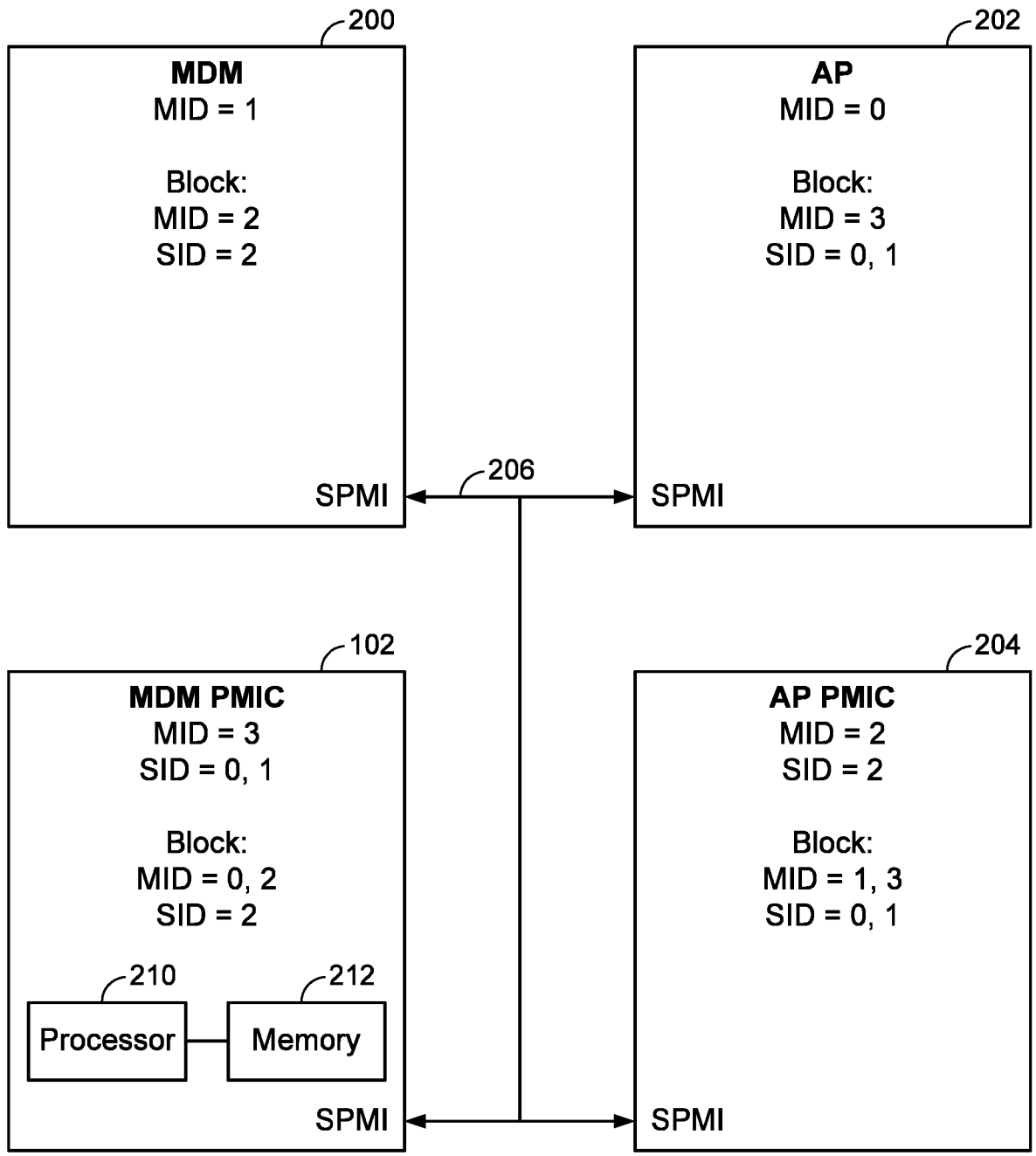
FIG. 2 is a block diagram of a chipset according to an aspect of the present invention.

With reference to FIGS. 1 and 2, a computing device 100 includes an integrated circuit 102 including a processor 210 to monitor a communication interface arbitration sequence on a system bus 206, determine, based on the monitored arbitration sequence, a master or slave identifier that is sending a transaction on system bus 206, and process the transaction based on the determined master or slave identifier that is sending the transaction. A transaction may be a message or command sent on system bus 206. In one aspect, the communication interface arbitration sequence includes a power management interface arbitration sequence.

Continuing with FIG. 1, computing device 100 includes one or more sensors 104, a wireless interface 106, an antenna 110, a bus 112, an I/O interface 114, a memory 116, and a camera 118. Bus 112 may suitably be an external bus between chips. Wireless interface 106 can include a wireless receiver, transmitter, transceiver, and/or other elements that enable computing device 100 to send and/or receive data using WWAN, WLAN, and/or other suitable wireless communication protocols. Wireless interface 106 can include one or more multi-mode modems capable of transmitting and receiving wireless signals using multiple wireless communications standards. Wireless interface 106 is connected by a line 108 to antenna 110 for sending and receiving communications to/from other wireless transmitters, a wireless base station, and/or other wireless devices configured to communicate using wireless communication protocols. While computing device 100 illustrated in FIG. 1 includes a single wireless interface 106 and a single antenna 108, other implementations of computing device 100 can include multiple wireless interfaces 106 and/or multiple antennas 110. Computing device 100 can be any suitable electronic device incorporating one or more integrated circuits such as a desktop computer, an Internet of Things (IoT) device or an end user mobile device such as a laptop, a cellphone, a smartphone, or a tablet.

Continuing with FIG. 1, I/O interface 114 can provide one or more ports and/or other interfaces that can provide for data inputs and/or outputs to computing device 100. For example, I/O interface 114 can include one or more ports, such as a Universal Serial Bus (USB) port and/or other type of port that can be used to connect external devices to the computing device. I/O interface 114 can also include one or more input devices, such as buttons, switches, a keypad, a touchscreen and/or other means for receiving input from a user. I/O interface 114 can also include one or more means for outputting audio and/or visual content, such as a screen, a speaker, a headphone port and/or other means for outputting such content.

In one aspect, memory 116 can be a non-transitory storage device or computer-readable medium that can include random access memory (RAM), read-only memory (ROM), or a combination thereof. Such a memory can store processor-readable, processor-executable software code containing instructions for controlling the processor circuit to perform functions described herein (although the description may read that the software performs the function(s)). The software can be loaded onto the memory by being downloaded via a network connection, uploaded from a disk, etc. Further, the software may not be directly executable, e.g., requiring compiling before execution.

The software in the memory is configured to enable the processing circuit to perform various actions, including implementing sending and/or receiving data from other wireless transmitters, a wireless base station, other computing devices, and/or other devices configured for wireless communication.

Continuing with FIG. 2, integrated circuit 102 of FIG. 1 is shown in combination with one or more other integrated circuits 200, 202, and 204 connected via system bus 206 to form a chipset. The chipset includes integrated circuit 102 which in the example shown is a mobile data modem (MDM) power management integrated circuit (PMIC), referred to hereinafter as MDM PMIC 102. The chipset further includes a mobile data modem (MDM) 200, an application processor (AP) 202, and an AP PMIC 204. MDM PMIC 102 includes processor 210, a memory 212, and one or more registers (not shown) for reading or writing data.

Figure 3:
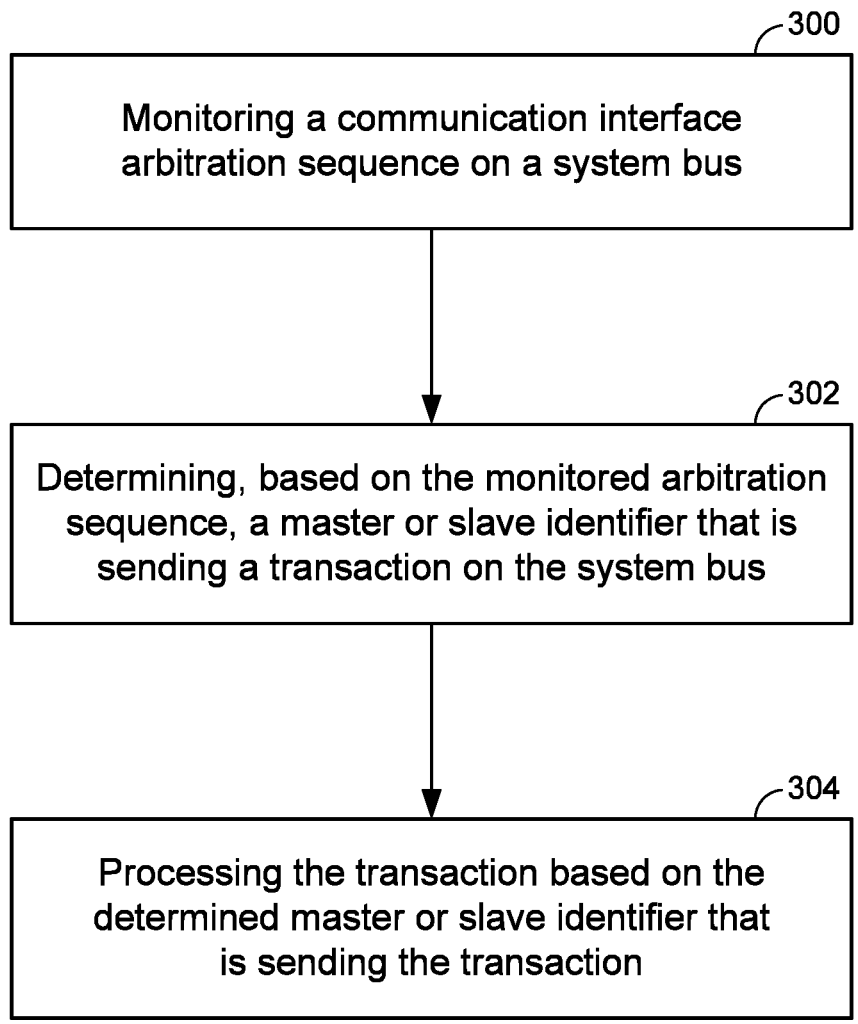
FIG. 3 is a flow diagram of a communication scheme according to an aspect of the present invention.
Figure 4:
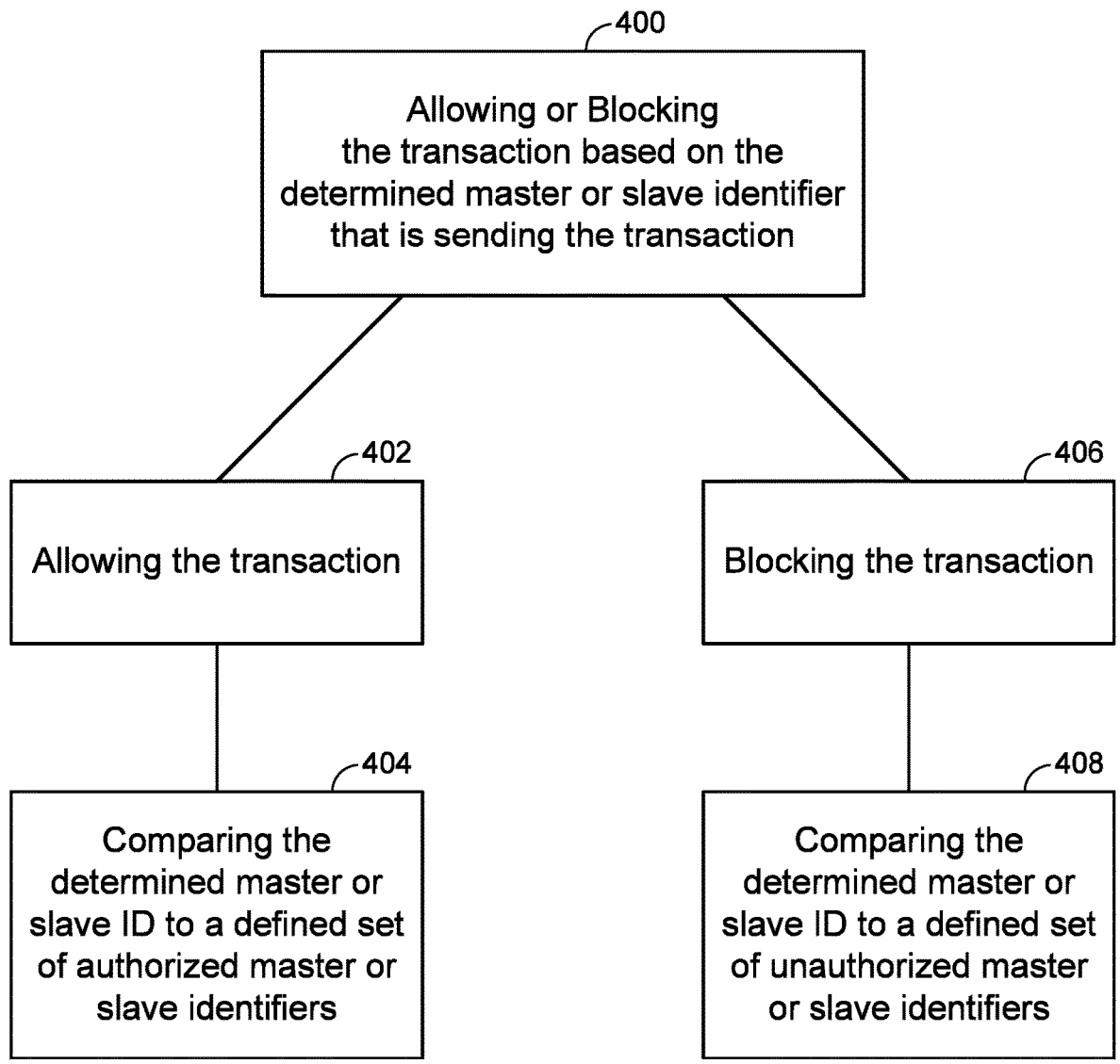
FIG. 4 is a flow diagram of a portion of the communication scheme shown in FIG. 3 according to aspects of the present invention.

With reference to FIGS. 2, 3, and 4, MDM PMIC 102 can be suitably configured to perform a method of providing communications (for example, power management) in an apparatus (e.g., MDM PMIC 102) including monitoring a communication interface arbitration sequence on a system bus at 300, determining, based on the monitored arbitration sequence, a master or slave identifier (ID) that is sending a transaction on the system bus at 302, and processing the transaction based on the determined master or slave identifier that is sending the transaction at 304. In one aspect, the communication interface arbitration sequence includes a power management interface arbitration sequence. In another aspect, the method further includes determining, based on the monitored arbitration sequence, a master identifier (ID) that is sending a transaction on system bus 206 by monitoring master priority level slots during at least a plurality of monitored arbitration sequences to determine the master identifier of a winning master, to be described in more detail below. Preferably, the master priority level slots are monitored during all of the monitored arbitration sequences to determine the master identifier of a winning master.

Aspects of processing the transaction based on the determined master or slave identifier that is sending the transaction are shown in FIG. 4 which includes allowing or blocking the transaction based on the determined master or slave identifier that is sending the transaction at 400. In one aspect, allowing the transaction at 402 includes comparing the determined master or slave identifier to a defined set of authorized master or slave identifiers at 404. In another aspect, blocking the transaction at 406 includes comparing the determined master or slave identifier to a defined set of unauthorized master or slave identifiers at 408.

Continuing with FIG. 2, an aspect of blocking the transaction is shown. As an example, MDM 200 has a master identifier (MID) equal to 1, AP 202 has an MID equal to 0, MDM PMIC 102 has an MID equal to 3 and a slave identifier (SID) equal to 0 or 1, and AP PMIC 204 has an MID equal to 2 and an SID equal to 2. MDM PMIC 102 can be suitably programmed to block MIDs equal to 0 or 2 and SID equal to 2 as shown in the figure. In the example shown in FIG. 2, MDM PMIC 102 can be suitably programmed to block ("blacklist") the transaction on system bus 206 from AP 202 and AP PMIC 204 since these integrated circuits correspond, respectively, to MID 0, 2. Registers included within MDM PMIC 102 may be suitably programmed with MID=0, 2 and SID=2 to block the transaction from such masters and slave components. In addition, MDM 200 may be suitably programmed to block MID=2 and SID=2, AP 203 may be suitably programmed to block MID=3 and SID=0, 1, and AP PMIC 204 may be suitably programmed to block MID=1, 3 and SID=0, 1. Through such a blocking scheme, an integrated circuit such as MDM PMIC 102 can allow transactions from certain components such as MDM 200 and block transactions from certain components such as AP 202 and AP PMIC 204 to prevent rogue or malicious software from accessing MDM PMIC 102 thereby increasing the security of a system.

Figure 5:
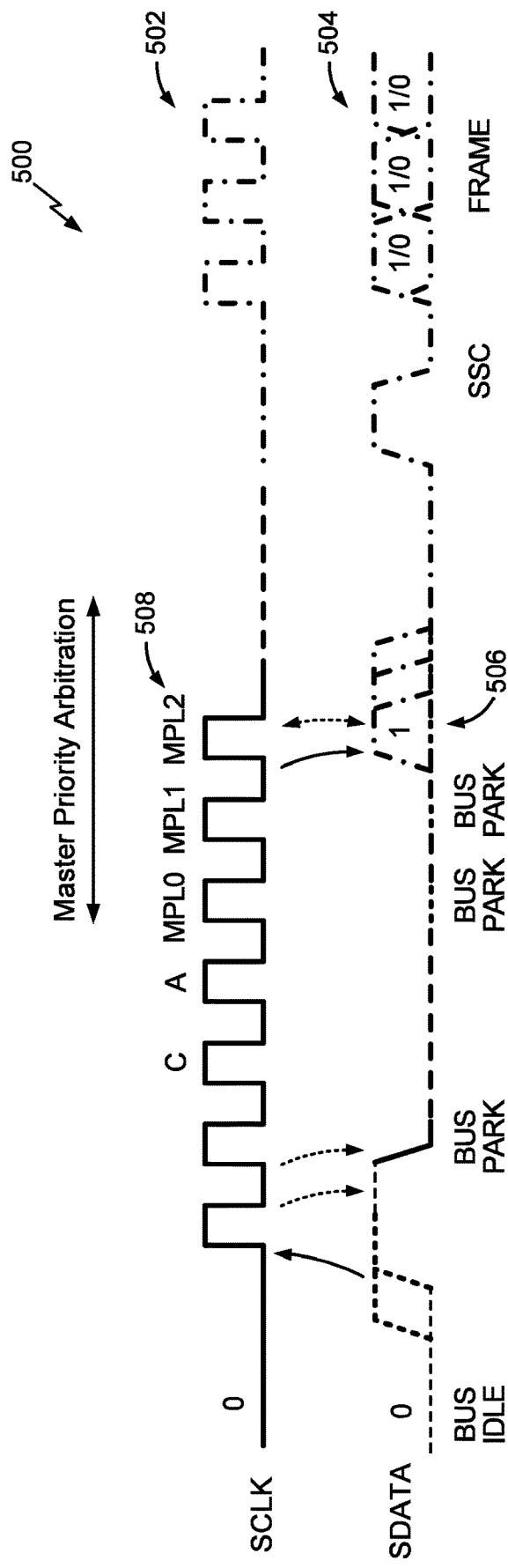
FIG. 5 is an example of a master priority arbitration scheme according to an aspect of the present invention.

With reference to FIGS. 2, 5, and 6, a determination or decoding (e.g., by MDM PMIC 102 of FIG. 2), based on a monitored arbitration sequence, of a master identifier (MID) that is sending a transaction on system bus 206 will now be described within an example context of a system power management interface (SPMI). The Bus Owner Master (BOM) on the SPMI bus (e.g., system bus 206) always has a Master Priority Level (MPL)=3. SPMI Masters have a fixed MID. In PMIC Controller chipsets, the PMIC (e.g., MDM PMIC 102) will always be the first SPMI Master on the SPMI bus (e.g., system bus 206) and thus it is the BOM and has a MPL=3. Additional SPMI Masters that join the system bus can conform to Table 15 of the SPMI v2.0 specification.

As shown in FIGS. 2, 5, and 6, by monitoring the MPL slots (for example, MPL0, MPL1, MPL2) during arbitration (502, 504), MDM PMIC 102 may determine the MID of the winning master. In FIG. 5, "C" denotes connect sequence, "A" denotes an alert bit for slave arbitration, and "SSC" denotes sequence start condition which resets a state machine to receive commands. Starting from the PMIC SPMI Master (e.g., AP PMIC 204) being the BOM with an MPL=3 and a MID=2 as an example (see 602 of FIG. 6), if MPL=2 (see 508 of FIG. 5) wins arbitration, then it is MID=1 (see 604 of FIG. 6) that is sending the transaction on system bus 206. In the example shown in FIG. 2, MID of 1 is MDM 200 and therefore, the transaction on system bus 206 is not blocked by MDM PMIC 102.

As shown in FIG. 5, SPMI clock (SCLK) 502 and SPMI data (SDATA) 504 are sent over system bus 206 and SDATA goes high (506) when a master having MPL=2 (508) wins arbitration. As shown in FIG. 6 at 604 within table 600, such a winning master has an MID of 1. Therefore, the winning master is MDM 200 in the example chipset configuration shown in FIG. 2. In another aspect, the slave ID (SID) of a winning slave during arbitration is the slave with the highest SID. Such a scheme prevents SPMI transactions from unapproved masters and slaves from being received by MDM PMIC 102. The master and slave identifiers are pre-defined as either allowed or dis-allowed. Transactions are either allowed or blocked based on the determined master or slave identifier.

In accordance with one aspect of the present invention, a computing device includes means for monitoring a communication interface arbitration sequence on a system bus (for example, processor 210 of FIG. 2, 300 of FIG. 3), means for determining, based on the monitored arbitration sequence, a master or slave identifier that is sending a transaction on the system bus (for example, processor 210, 302 of FIG. 3), and means for processing the transaction based on the determined master or slave identifier that is sending the transaction (for example, processor 210, 304 of FIG. 3). The means for processing the transaction includes means for allowing or blocking the transaction based on the determined master or slave identifier that is sending the transaction (for example, processor 210, FIG. 4). The means for allowing the transaction includes means for comparing the determined master or slave identifier to a defined set of authorized master or slave identifiers (for example, processor 210, one or more registers, 404 of FIG. 4). Alternatively, the means for blocking the transaction includes means for comparing the determined master or slave identifier to a defined set of unauthorized master or slave identifiers (for example, processor 210, one or more registers, 408 of FIG. 4). The computing device further includes means for determining, based on the monitored arbitration sequence, a master identifier that is sending a transaction on the system bus by monitoring master priority level slots during a plurality of monitored arbitration sequences to determine the master identifier of a winning master (for example, processor 210, 302 of FIG. 3).

In accordance with another aspect of the present invention, a non-transitory, computer-readable medium, having stored thereon computer-readable instructions for providing communications, comprising instructions configured to cause an apparatus to monitor a communication interface arbitration sequence on a system bus, determine, based on the monitored arbitration sequence, a master or slave identifier that is sending a transaction on the system bus, and process the transaction based on the determined master or slave identifier that is sending the transaction. wherein to process the transaction includes to allow or block the transaction based on the determined master or slave identifier that is sending the transaction. The non-transitory, computer-readable medium further includes to allow the transaction includes to compare the determined master or slave identifier to a defined set of authorized master or slave identifiers. The non-transitory, computer-readable medium further includes to block the transaction includes to compare the determined master or slave identifier to a defined set of unauthorized master or slave identifiers. The non-transitory, computer-readable medium further includes to determine, based on the monitored arbitration sequence, a master identifier that is sending a transaction on the system bus by monitoring master priority level slots during a plurality of monitored arbitration sequences to determine the master identifier of a winning master. Such a non-transitory, computer-readable medium can be embodied in memory 116 shown in FIG. 1 and/or in memory 212 shown in FIG. 2.

A processor (aka, processing circuit) may be any programmable microprocessor, microcomputer or multiple processor chip or chips that can be configured by software instructions (applications) to perform a variety of functions, including the functions of the various aspects described above. In some devices, multiple processors may be provided, such as one processor dedicated to wireless communication functions and one processor dedicated to running other applications. Typically, software applications may be stored in the internal memory before they are accessed and loaded into the processor. Processor may include internal memory sufficient to store the application software instructions. In many devices, the internal memory may be a volatile or nonvolatile memory, such as flash memory, or a mixture of both. For the purposes of this description, a general reference to memory refers to memory accessible by a processor including internal memory or removable memory plugged into the device and memory within the processor itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory, computer-readable or processor-readable storage media may be any storage media that may be accessed by a computer or a processor. By way of example but not limitation, such non-transitory, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory, computer-readable and processor-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method of providing communications in an apparatus, comprising:
    monitoring a communication interface arbitration sequence on a system bus having only a clock signal line and a data signal line, wherein the arbitration sequence includes a plurality of master priority level slots;
    detecting a master priority level within the monitored arbitration sequence based on a master priority level slot of the plurality of master priority slots in which a master drives the data signal line for sending a transaction on the system bus;
    using the determined master priority level to determine a master identifier of the master that is sending the transaction on the system bus; and
    processing the transaction based on the determined master identifier of the master that is sending the transaction.

2. The method of claim 1, wherein processing the transaction includes allowing or blocking the transaction based on the determined master identifier of the master that is sending the transaction.

3. The method of claim 2, wherein allowing the transaction includes comparing the determined master identifier to a defined set of authorized master identifiers.

4. The method of claim 2, wherein blocking the transaction includes comparing the determined master identifier to a defined set of unauthorized master identifiers.

5. The method of claim 1, wherein the communication interface arbitration sequence includes a power management interface arbitration sequence.

6. An integrated circuit comprising:
    a processor to:
        monitor a communication interface arbitration sequence on a system bus having only a clock signal line and a data signal line, wherein the arbitration sequence includes a plurality of master priority level slots;
        detect a master priority level within the monitored arbitration sequence based on a master priority level slot of the plurality of master priority slots in which a master drives the data signal line for sending a transaction on the system bus;
        use the determined master priority level to determine a master identifier of the master that is sending the transaction on the system bus; and
        process the transaction based on the determined master identifier of the master that is sending the transaction.

7. The integrated circuit of claim 6, wherein the processor to process the transaction includes to allow or block the transaction based on the determined master identifier of the master that is sending the transaction.

8. The integrated circuit of claim 7, wherein the processor to allow the transaction includes to compare the determined master identifier to a defined set of authorized master identifiers.

9. The integrated circuit of claim 7, wherein the processor to block the transaction includes to compare the determined master identifier to a defined set of unauthorized master identifiers.

10. The integrated circuit of claim 6 wherein the communication interface arbitration sequence includes a power management interface arbitration sequence.

11. A computing device comprising:
    means for monitoring a communication interface arbitration sequence on a system bus having only a clock signal line and a data signal line, wherein the arbitration sequence includes a plurality of master priority level slots;
    means for detecting a master priority level within the monitored arbitration sequence based on a master priority level slot of the plurality of master priority slots in which a master drives the data signal line for sending a transaction on the system bus;
    means for determining, using the determined master priority level, a master identifier of the master that is sending the transaction on the system bus; and
    means for processing the transaction based on the determined master identifier of the master that is sending the transaction.

12. The computing device of claim 11, wherein the means for processing the transaction includes means for allowing or blocking the transaction based on the determined master identifier of the master that is sending the transaction.

13. The computing device of claim 12, wherein the means for allowing the transaction includes means for comparing the determined master identifier to a defined set of authorized master identifiers.

14. The computing device of claim 12, wherein the means for blocking the transaction includes means for comparing the determined master identifier to a defined set of unauthorized master identifiers.

15. The computing device of claim 11, wherein the communication interface arbitration sequence includes a power management interface arbitration sequence.

16. A non-transitory, computer-readable medium, having stored thereon computer-readable instructions for providing communications, comprising instructions configured to cause an apparatus to:
    monitor a communication interface arbitration sequence on a system bus having only a clock signal line and a data signal line, wherein the arbitration sequence includes a plurality of master priority level slots;
    detect a master priority level within the monitored arbitration sequence based on a master priority level slot of the plurality of master priority slots in which a master drives the data signal line for sending a transaction on the system bus;

use the determined master priority level to determine a master identifier of the master that is sending the transaction on the system bus; and process the transaction based on the determined master identifier of the master that is sending the transaction.

17. The non-transitory, computer-readable medium of claim 16, wherein to process the transaction includes to allow or block the transaction based on the determined master identifier of the master that is sending the transaction.

18. The non-transitory, computer-readable medium of claim 17, wherein to allow the transaction includes to compare the determined master identifier to a defined set of authorized master identifiers.

19. The non-transitory, computer-readable medium of claim 17, wherein to block the transaction includes to compare the determined master identifier to a defined set of unauthorized master identifiers.

20. The non-transitory, computer-readable medium of claim 16, wherein the communication interface arbitration sequence includes a power management interface arbitration sequence.

* * * * *